Jan. 2, 1940.  H. L. SMITH  2,185,740
DYNAMO-ELECTRIC MACHINE
Filed Nov. 1, 1937

Inventor
Harold L. Smith

Patented Jan. 2, 1940

2,185,740

UNITED STATES PATENT OFFICE 2,185,740

DYNAMO-ELECTRIC MACHINE

Harold L. Smith, Whitefish Bay, Wis., assignor to The Louis Allis Company, Milwaukee, Wis., a corporation of Wisconsin Application November 1, 1937, Serial No. 172,127

6 Claims. (Cl. 171—252)

This invention relates to dynamo-electric machines and refers particularly to totally enclosed explosion-proof electric motors.

The cooling of dynamo-electric machines of this type has always been a problem, which becomes more difficult as the motor size increases. This is due to the fact that the developed heat rises proportionately with the increasing volume, while the ratio between the available cooling surface and the volume decreases. The proportionately smaller surface area of large motors precludes the dissipation of the generated heat to the outside atmosphere when such motors are constructed in accordance with past designs.

It is therefore an object of this invention to improve the design and construction of dynamo-electric machines to provide more effective cooling.

Directed toward the attainment of this broad general object, it is contemplated to provide a dynamo-electric machine so constructed that it has greater surface area for direct conduction of heat to outside atmosphere, together with means for setting up definite air circuits, both within the motor and around the exterior thereof.

A particular object of this invention is to so design the stator and rotor, that cooling air currents are caused to travel through the inner portions thereof to carry off the heat from the seat of its origin.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

Figure 1:
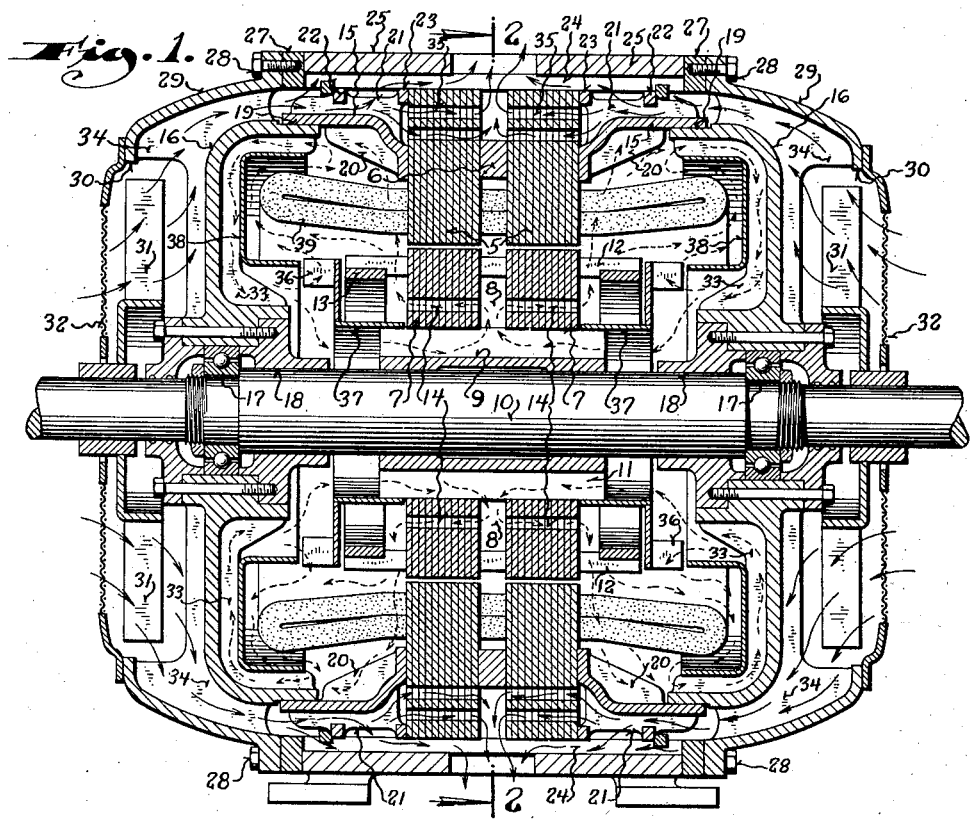
Figure 2:
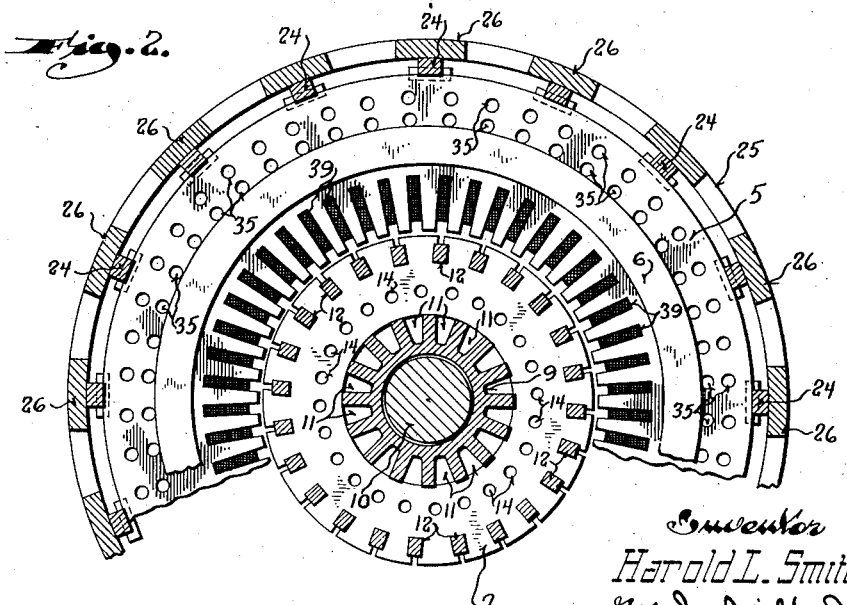

The accompanying drawing illustrates one complete example of the physical embodiment of the invention constructed in accordance with the best mode so far devised for the practical application of the principles thereof, and in which:

Figure 1 is a longitudinal sectional view through an electric motor constructed in accordance with this invention; and Figure 2 is a cross sectional view through a motor taken on the plane of the line 2—2 in Figure 1.

Referring now particularly to the accompanying drawing in which like numerals indicate like parts, the numeral 5 designates a stator core, which, as is customary, is laminated, and, as shown, is arranged in two sections spaced apart by a solid ring 6. The outer diameter of the stator core is exposed to external air caused to flow thereover in a manner to be hereinafter described.

Arranged within the stator is the rotor core 7, which is also formed in two sections with a central air passage 8 therebetween. The rotor core 7 is mounted upon a rotor spider 9 fixed to a shaft 10, the rotor spider, as best shown in Figure 2, having its outer portion radially ribbed to provide longitudinal air passages 11 which communicate with the central air passage 8.

The rotor laminations carry the customary rotor bars 12, which project from the opposite ends of the core to have rings 13 secured thereto. The projecting end portions of the rotor bars serve as air impellers to draw cooling air outwardly from the air passage 8 through vents 14 in the rotor core laminations.

The stator laminations are clamped between end rings or flanges 15, which extend endwise beyond the stator a substantial distance and coact with end plates or end bells 16 to form an inner casing having sufficient strength to resist and confine a gaseous explosion within its interior. The end plates or end bells 16 carry bearings 17 in which the shaft 10 is journalled, and to prevent the leakage of gases along the shaft past the bearings, each bearing has a part 18 bored to fit the shaft with a close clearance and long enough to quench ignited gas emanating from the interior of the motor before it reaches the exterior atmosphere.

Likewise, the connections between the end plates 16 and the flanges 15 incorporate an elongated joint 19 to quench any ignited gas attempting to pass from the interior of the motor at these points.

The end rings or flanges 15 have internal and external radial flanges 20 and 21, respectively, to increase the surface area both on the inside and the outside of the inner casing. The outer flanges 21 are joined by annular rings 22 and 23, the latter contacting the sides of the stator core. These rings have an outside diameter equal to that of the stator core so as to engage the inner faces of a plurality of spacing bars 24 carried by two spaced ring-like members 25 which constitute the main part of the outer casing.

The bars 24 are suitably secured to the rings 25 and the rings are spaced apart with the space therebetween located at the center of the motor. Cross bars 26 in line with the spacing bars 24 rigidly join the rings 25. Each of the spacing bars 24 has keys fixed therein to engage the rings 22 so that the flanges 21 are held assembled with the stator core by the bars 24.

At their outer ends, the cylindrical rings 25 carry narrow fastening bands or rings 27, the inner faces of which engage the ends of the bars 24. These attaching bands or rings 27 are tapped for the reception of cap screws 28 by which the end bells are held assembled with the rings 25. The cap screws pass through flanges on outer shells 29, which form part of the end bells, being integrally joined thereto by radial ribs 34. The outer shells 29 thus cooperate with the rings 25 to form an outer casing.

Central openings 30 in the outer shells 29 provide for the admission of air to air impellers or fans 31 fixed to the rotor shaft and arranged to draw air into the outer casing. As shown, the fans 31 are disposed in close juxtaposition to the outer edges of the ribs 34 which are cut away to receive the fans.

The ribs 34 thus immediately divide the air currents induced by the fans 31, into separate streams which flow radially outward over the end bells to enter the air passages formed between the outer rings 25 and the flanges 15. Part of the air entering these passages travels over the outside of the stator core to issue through the space between the rings 25 and part passes through vents 35 extending through the stator laminations and opening into the space between its two sections outwardly of the ring 6. Cooling air is thus carried directly into the heart of the stator.

The openings 30 are preferably covered by perforated guards.

While the fans or impellers 31 produce a flow of air over the exterior of the inner casing, which by the construction described, is confined to definite paths to obtain optimum results, the projecting end portions of the rotor bars acting in conjunction with fans 36 fixed to the rotor, set up air currents within the inner casing to carry the heat from the inner portions of the motor outwardly into contact with the walls of the inner casing for conduction therethrough to the outer cooling air.

Each fan 36 is mounted on the outer peripheral portion of a deflector 37. These deflectors are right-angular in cross section with one flange thereof cylindrical and the other flange normal to the axis of the motor, the cylindrical flanges being fixed to the rotor spider. The blades of the fans 36 are in close juxtaposition to the inner peripheral edges of other deflectors 38 which are carried by inner ribs 33 on the end bells 16, and are so shaped as to substantially embrace the outer ends of the stator coils 39.

With this disposition of the fans 36 and the deflectors or baffles 37 and 38, the air currents set up within the inner casing are as shown by the dotted arrows in Figure 1, and briefly described, take the following course. Beginning with a fan 36, air is thrown outwardly against the stator coils 39 with part of it passing between the sections thereof and the main portion flowing around the ends of the coils, to which path it is constrained by the deflector or baffle 38. This moving air current picks up the heat generated in the coils and partially dissipates the same by contact with the flange 15 and its ribs 20. After passing over these parts, the air continues back through the space between the deflector or baffle 38 and the end bell 16 giving up more of the heat it carries to the end bell and its ribs 33 which divide this space radially into separated passages.

Part of the air now returns to the fan, and another portion thereof moves inwardly along the shaft through the air passages 11 in the rotor spider to the very heart of the rotor where it enters the space 8 and flows outwardly through the vents 14, the action of the rotor bars 12 assisting this latter movement of the air. Emanating from the vents 14 this air flows outwardly into the space lying within the stator coils to repeat its circuit.

From the foregoing description taken in connection with the accompanying drawing, it will be readily apparent to those skilled in the art to which this invention appertains that by the provision of increased surface area, both on the inside and the outside of the inner casing and the provision of the means which defines the paths of the air currents, a more effective cooling of a dynamo-electric machine is obtained, making possible the building of totally enclosed explosion-proof motors in the larger sizes.

What I claim as my invention is:

1. In a dynamo-electric machine: a stator core; annular rings engaging the ends of the core, said rings having their portions which engage the stator core disposed radially inwardly of the periphery of the core so that a peripheral portion of the core lies radially outwardly of the rings; said peripheral portion of the stator core having cross vents therethrough; an end plate having an explosion-proof connection with each of said rings to cooperate with said rings and the stator core to form a closed inner casing; bearings carried by said end plates; a rotor having its shaft journalled in said bearings; air impellers fixed to the shaft outside said end plates; and an outer casing around the inner casing with a portion thereof encircling the exposed peripheral portion of the stator core in radially spaced relation thereto to form air passages leading from said air impellers to and around the exposed peripheral portion of the stator core so that air currents induced by said impellers flow over the walls of the inner casing, said exposed peripheral portion of the stator core, and through the air vents in said exposed peripheral portion of the stator core.

2. In a dynamo-electric machine: a stator having a core with coils projecting from the ends thereof; means cooperating with the stator core to form an inner casing enclosing the inner portion of the stator and its coils; bearings carried by opposite walls of said inner casing; a rotor journalled in said bearings and having a core for cooperation with the stator core; annular baffles carried by said opposite walls in spaced relation thereto and so shaped as to partially enclose the outer end portions of the stator coils to form passages for air around the end portions of the same interiorly of the baffles and passages for air exteriorly of the baffles; and means carried by the rotor for causing a flow of air outwardly between the sections of the stator coils and through the interior passages around the ends thereof to the exterior passages defined by said annular baffles and the adjacent walls of the casing so that such air flows inwardly through said exterior passages toward the axis of the machine.

3. In a dynamo-electric machine: a stator having a core provided with coils projecting from the ends thereof; annular rings joined to the opposite ends of the core and projecting endwise therefrom; end plates connected to said rings to cooperate with said rings and the core in the formation of a closed inner casing; bearings carried by said end plates; a rotor having its shaft journalled in said bearings, said rotor comprising a laminated core divided into endwise spaced sections with an air passage therebetween, said rotor having longitudinal air passages leading from the ends of its core to the air passage between its sections, and the core sections having longitudinal vents opening to said air passage; annular baffles carried by the end plates in spaced relation thereto and substantially embracing the ends of the stator coils so as to provide inner and outer air passages; and means carried by the rotor for inducing a flow of air outwardly between the sections of the stator coils and around the ends thereof into the outer air passages to flow inwardly therethrough toward the center of the machine for entrance into the longitudinal air passages of the rotor and subsequent passage through the vents in the core sections.

4. In a dynamo-electric machine: a stator having a core provided with coils projecting from at least one end thereof; means cooperating with said stator core to form a closed casing, said means including an end plate spaced from the projecting ends of the stator coils; spaced radial ribs on the inner surface of said end plate; an annular baffle mounted on said ribs and shaped to substantially embrace said projecting ends of the stator coils, said baffle cooperating with the end plate to from air passages bounded on the outside by said end plate and separated by the radial ribs carried thereby; a rotor operating within said casing; and means turning with the rotor for inducing a flow of air radially outwardly past the projecting end portions of the stator coils and into said air passages to return radially inwardly across the inner face of said end plate.

5. In a dynamo-electric machine: a closed casing having an end wall; a stator core having a part thereof within the casing; a rotor core disposed within the casing; means mounting the rotor core in cooperative relation to the stator core, said means having openings providing longitudinal air passages through the rotor core at its hub; two baffles disposed within said casing, one of which is stationary and carried by the end wall in spaced relation thereto to form an air passage between the inner face of said end wall and said baffle, and the other of which is rotatable with the rotor and has a part disposed opposite a portion of the stationary baffle and another part arranged to guide air to said longitudinal air passages in the hub of the rotor core; and impeller blades carried by the rotatable baffle and extending across the space between it and the adjacent portion of the stationary baffle to cause air to move radially outwardly between the baffles and to return radially inwardly across the inner surface of the end wall to be divided by the rotating baffle for passage to the longitudinal air passages in the hub of the rotor core and the impeller.

6. In a dynamo-electric machine: a stator having a core provided with coils projecting from the ends thereof; walls cooperating with the ends of the stator core to form a completely enclosed casing; a rotor core disposed within the casing; means mounting the rotor core in cooperative relation to the stator core, said means having openings providing longitudinal air passages through the rotor core at its hub; baffles disposed within said casing, one of which is stationary and carried by the end wall of the casing in spaced relationship therewith to form an air passage between the inner face of said end wall of the casing and said baffle, and the other of which is rotatable with the rotor and has a part disposed opposite a portion of the stationary baffle and another part forming a wall between the longitudinal air passages at the hub of the rotor core and the stator coils; and impeller blades carried by the rotatable baffle and extending across the space between it and the adjacent portion of the stationary baffle so as to cause air to move radially outwardly between the baffles for passage through the spaces between the stator coils and around the ends thereof to return radially inwardly across the inner surface of said end wall of the casing to be guided by said wall forming part of the rotatable baffle into the longitudinal air passages in the hub of the rotor core.

HAROLD L. SMITH.